Sept. 21, 1948.

O. R. NEMETH 2,449,713

COOLING SYSTEM FOR PORTABLE
MOTION PICTURE PROJECTORS

Filed June 14, 1945

INVENTOR.
Otto R. Nemeth
BY
R. J. Schwarz
ATTORNEY

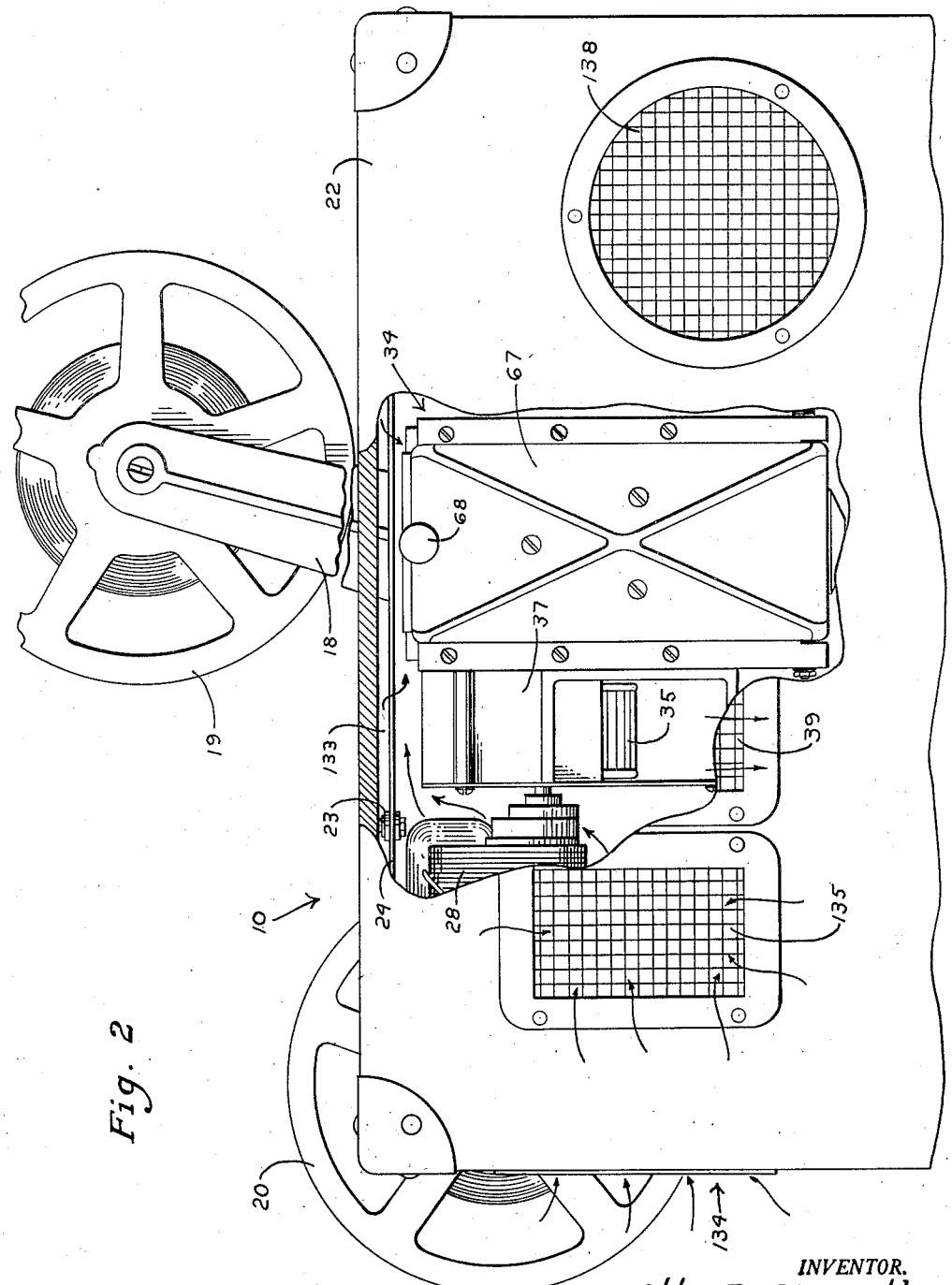

Sept. 21, 1948.                O. R. NEMETH                2,449,713
                       COOLING SYSTEM FOR PORTABLE
                         MOTION PICTURE PROJECTORS
Filed June 14, 1945                                 5 Sheets-Sheet 3
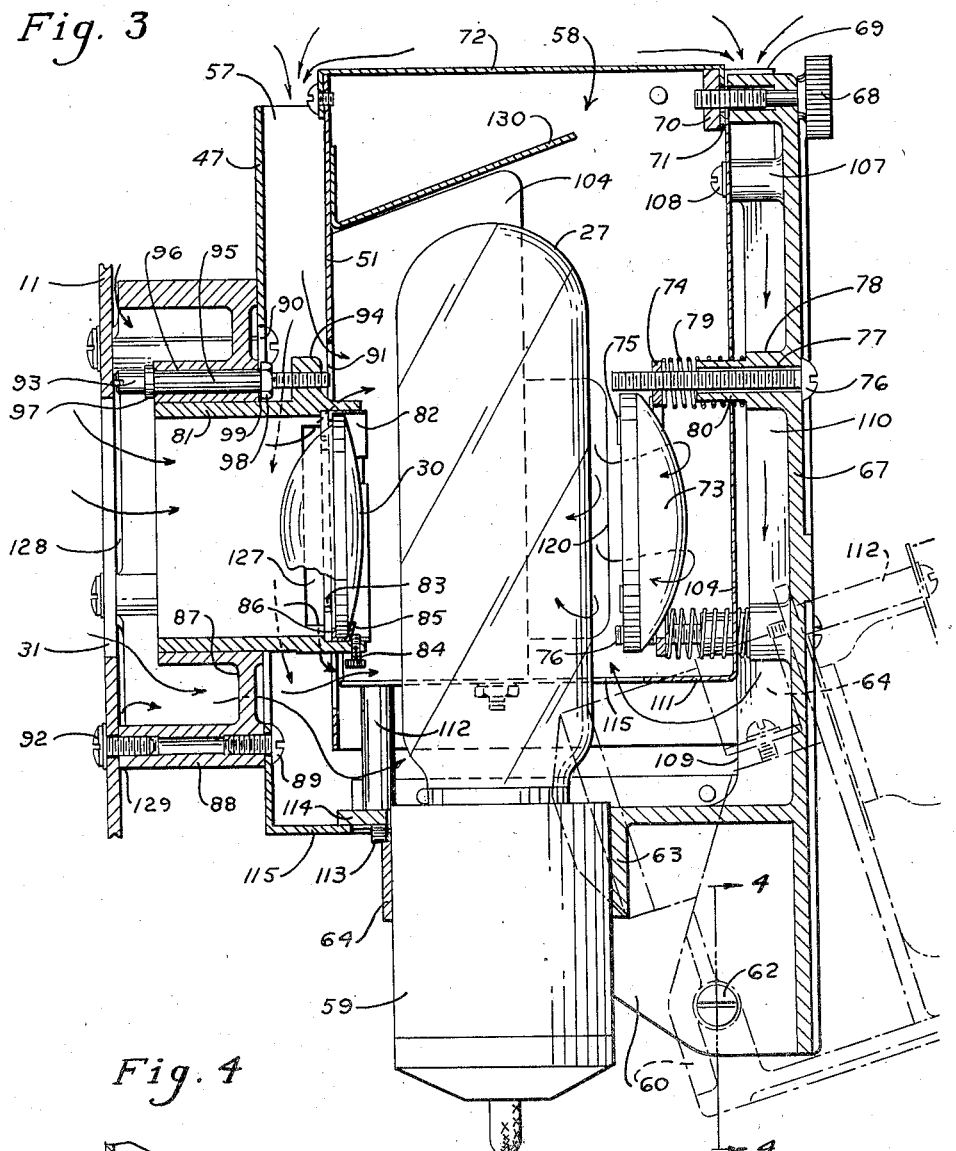
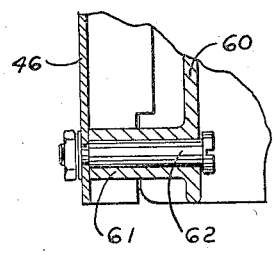
INVENTOR.
Otto R. Nemeth
BY
R. J. Schwarz
ATTORNEY

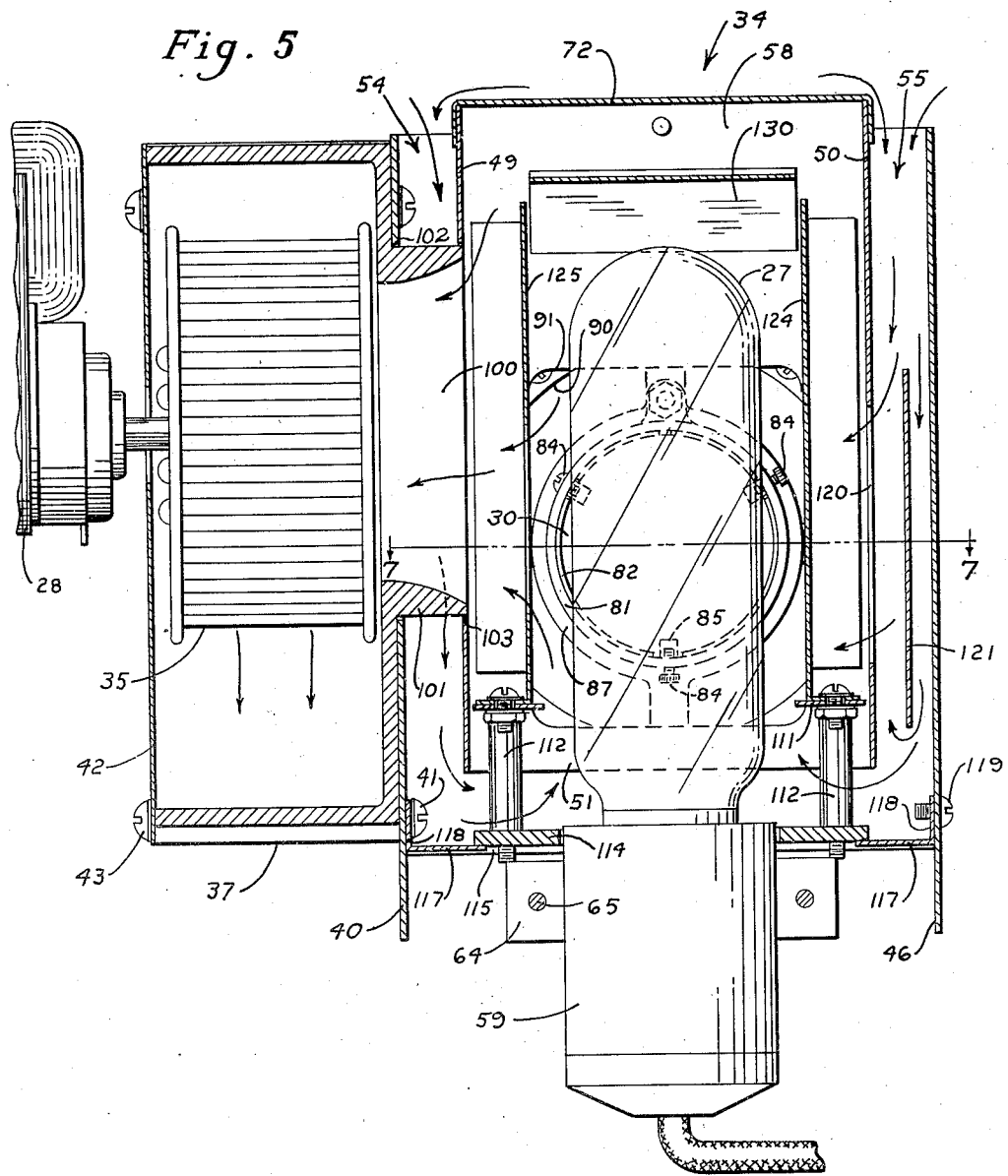

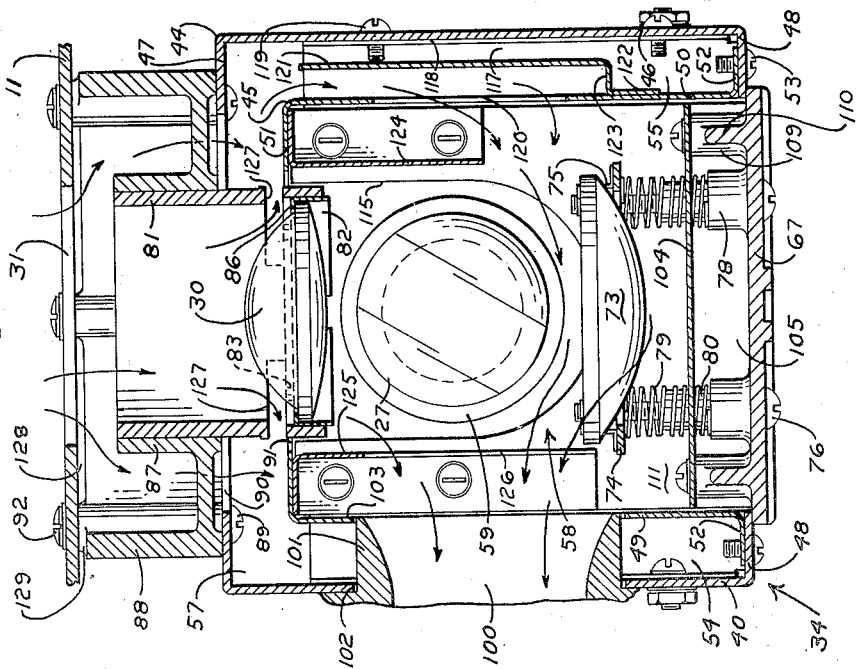

Patented Sept. 21, 1948

2,449,713

UNITED STATES PATENT OFFICE 2,449,713

COOLING SYSTEM FOR PORTABLE MOTION-PICTURE PROJECTORS

Otto R. Nemeth, Chicago, Ill., assignor, by mesne assignments, to Helene Curtis Industries, Inc., a corporation of Illinois Application June 14, 1945, Serial No. 599,491

6 Claims. (Cl. 88—24)

1

This invention relates to an improved cooling system for portable motion picture projectors, especially of the kind that are adapted for home and educational uses or for use in places where a standard motion picture machine is not or cannot practically be made available, such as encountered under active military conditions.

A portable motion picture projector of the kind with which the present invention is particularly useful includes an enclosing casing within which the operating mechanism is housed. Since the operating mechanism includes heat producing devices such as electrical motors and a projection lamp of relatively high wattage and thus heat production, cooling circulation of air within the housing must be relied upon to avoid overheating. Much room for improvement has existed in prior projectors.

An object of the present invention is to provide an improved cooling system for maintaining the interior of a portable motion picture projector housing and the various operating mechanisms therein efficiently cool during operation.

Another object is to provide a new and improved cooling system in a portable motion picture projector wherein a forced circulation of air for cooling the projection lamp housing is also utilized in a novel manner to maintain the remainder of the projector apparatus cool.

Another object of the invention is to provide a new and improved lamp housing construction.

Yet another object of the invention is to provide a novel lamp housing construction for motion picture projectors from which the heat of the projection lamp is abstracted with unique effectiveness.

Other objects, features, and advantages of the present invention will be readily apparent from the following detailed description of a preferred embodiment of the invention taken in connection with the accompanying five sheets of drawings, in which:

Fig. 2 is a reverse side elevational view of the projector, with certain parts partially broken away and in section for the sake of clarity.

Fig. 3 is a vertical sectional detail view on an enlarged scale taken substantially along the line 3—3 of Fig. 1.

Fig. 4 is a fragmentary sectional detail view taken substantially on the line 4—4 of Fig. 3.

Fig. 5 is a vertical sectional detail view taken

Figure 1:
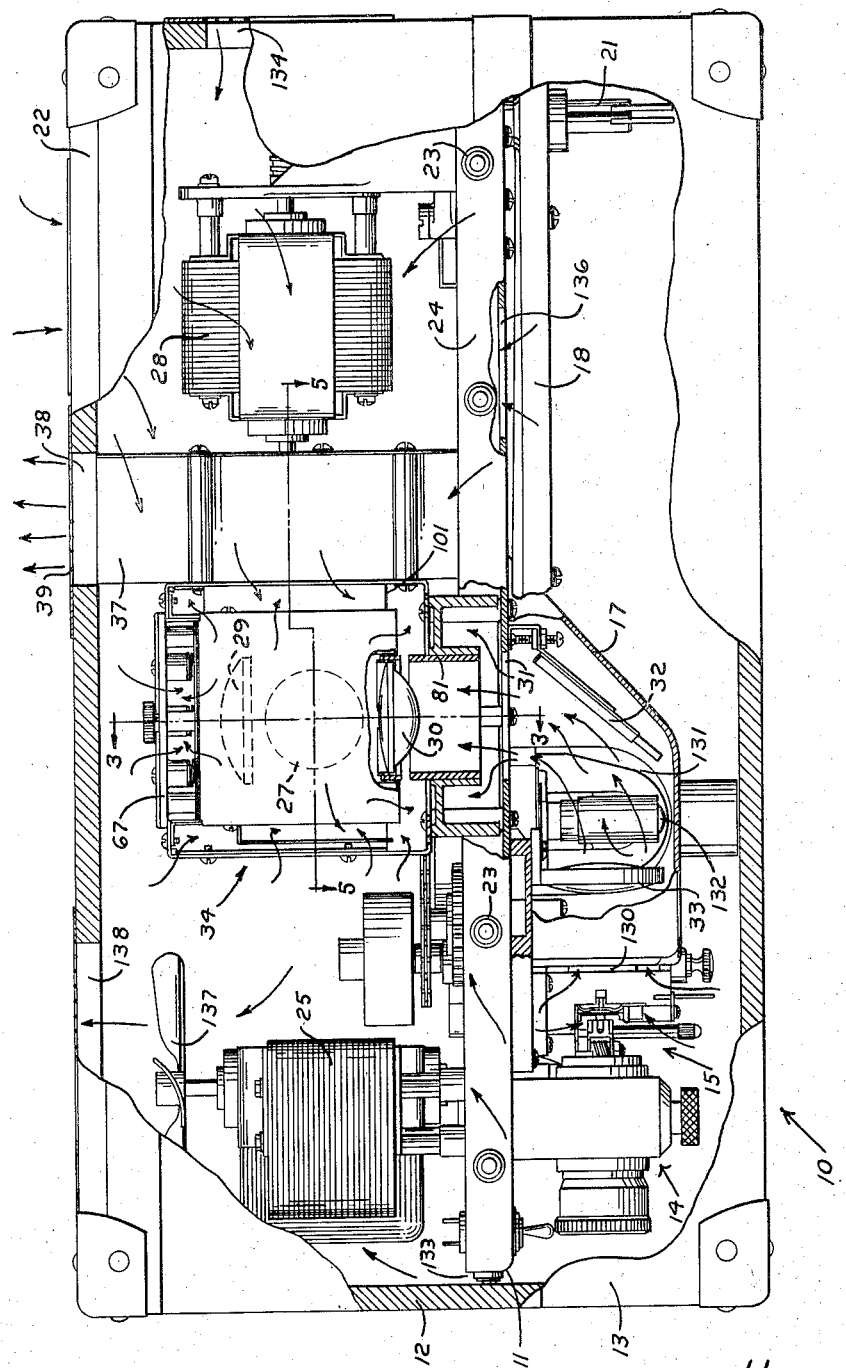
Fig. 1 is a top plan view, partially broken away and in section, of a portable motion picture projector embodying the features of the invention.

2 substantially along the line 5—5 of Fig. 1 and on an enlarged scale.

Fig. 6 is a bottom plan view of the lamp housing structure.

Fig. 7 is a horizontal sectional view through the lamp housing taken substantially along the line 7—7 of Fig. 5.

As best seen in Figs. 1 and 2 the invention may be embodied in a portable type motion picture projector 10 wherein all or most of the operating mechanism is carried by a vertical mounting plate 11 supported in a vertical plane within an enclosing casing 12. That portion of the casing 12 which encloses the obverse side of the mounting plate 11 may be in the form of a removable cover 13 which upon being removed freely exposes the actual picture projecting devices of the projector such as an objective lens unit 14, a film gate 15, and an enclosure or mechanism cover 17 located rearwardly of the film gate. Removal of the casing cover 13 also permits a pivotally mounted supply reel arm 18 to be swung up from inactive position (Fig. 1) within the cover to reel supporting position as shown in Fig. 2 for receiving a film supply reel 19, while a take-up reel 20 may be supported upon a spindle 21 located to protrude outwardly from the upper rear end portion of the mounting plate 11.

The remainder of the casing 12 is dimensioned to provide the actual support for the mounting plate 11 and is amply proportioned to accommodate various operating mechanisms projecting from the reverse side of the mounting plate. To enable ready access into the reverse side portion of the casing 12, it may be formed with a removable rear closure panel 22. Primarily for vibration proofing purposes, but also for air circulation purposes, a spaced, substantially vibration proof connection is provided between the mounting panel 11 and the casing 12 by means such as rubber or other resilient grommets or spacers 23 disposed in spaced relation between a right angular reinforcing and connecting flange 24 on the mounting panel and the adjacent inner marginal wall surfaces of the casing.

Within the chamber provided by the casing 12 on the reverse side of the mounting plate 11 are located such heat producing elements of the machine as a film actuating motor 25 adjacent to the front end of the chamber, a projection lamp 27 located near the center of the chamber, and a take-up and rewind drive motor 28 located adjacent to the rear of the chamber. By far the greatest amount of heat is produced, of course, by the projection lamp 27 which, in current practice, may be rated at 750 or 1,000 watts. The intense light produced by the lamp is concentrated into a projection beam by means of a mirror reflector 29 and a condenser collector lens 30 and is directed through an opening 31 in the mounting plate 11 onto a forty-five degree deflecting mirror 32 from which it is angled forwardly through a second condenser lens unit 33 and thence passes on through the film gate 15 and the objective lens unit 14.

A light-tight enclosure and supporting structure for the lamp 27 is provided by a lamp housing 34.

According to the present invention the construction and arrangement of the lamp housing 34 are such that the heat produced by the projection lamp 27 as well as heat produced by the motors, and especially the take-up and rewind motor 28, is effectually exhausted from and through the lamp housing. To this end, the lamp housing 34 is constructed as a compact and efficient circulation inducing unit and is equipped with a blower type centrifugal fan 35 which is preferably driven by the motor 28 and is located within a fan housing 37 discharging to atmosphere outside of the projector casing 12 as for example through an exhaust opening 38 in the back cover 22 protected by a grill 39. By preference, the blower fan housing 37 is formed as a casting adapted to be economically die cast which is mounted upon and carried as a unit by a side wall 40 of the lamp housing to which it may be removably secured as by means of screws 41. The side of the blower housing 39 opposite the lamp housing is preferably formed open so as to facilitate mounting of the blower fan 35 therein and is closed in suitable manner as by means of a closure plate 42 which may be removably secured as by means of screws 43 (Fig. 5).

For the purpose of economy and simplicity in manufacture, as well as to attain durability coupled with minimum weight and utmost compactness, the lamp housing 34 is preferably constructed in the main of sheet metal, most of the various parts being formed as simple self-reenforced stampings. Sheet aluminum has been found quite satisfactory for most of the parts because it is easy to form, light in weight, and a good heat conductor so that heat is quickly distributed throughout any such part instead of remaining relatively concentrated, as with steel. An important factor in permitting this type of construction can be attributed to the fact that the powerful suction type of air circulation induced by the fan 35 to sweep all heated surfaces of the lamp housing dissipates the heat from the lamp 27 so effectively that expansion and contraction and consequent buckling or distortion are maintained at absolute minimum and the exterior of the lamp housing remains inherently so cool that no dissipating fins or the like for external convection cooling are required. In fact my cooling system has been found to be so efficient that at any time during operation a person may safely place his hand upon any external surface of the housing which will be found to be only comfortably warm, and this in spite of the fact that but $\frac{3}{32}$ to $\frac{1}{8}$ of an inch of metal separates the hand from the intense heat generated by the projection lamp 27 as little as 1¼ inches away. In a typical installation a twenty-seven blade centrifugal fan three inches in diameter and 1½ inches wide, operating at 3600 R. P. M. has been found to give excellent results.

To the attainment of these accomplishments, the lamp housing 34 is preferably made up of two principal one-piece sheet metal shells of substantially rectangular U-shaped cross-section, comprising an outer shell 44 and an inner shell 45. In addition to providing the side wall 40 to which the blower housing is connected, the outer shell 44 has an opposite side wall 46 and an integral connecting wall 47. At the edges of the side walls 40 and 44, opposite to the connecting wall 47, are provided narrow inwardly directed right angular doorway flanges 48 (Figs. 6 and 7).

The inner shell 45 is formed as a substantial counterpart of the outer shell 44 on a reduced cross-section and comprises opposed side walls 49 and 50 and a connecting wall 51. At their edges opposite the connecting wall 51, the side walls 29 and 50 are each formed with an outwardly extending substantially right angular doorway flange 52 adapted to engage the inner faces of the contiguous outer shell doorway flanges 48 to which they may be removably secured as by means of screws 53. The dimensional relationship of the outer shell 44 to the inner shell 45 is preferably such that a substantially uniform spaced relationship is afforded between the respective opposed side walls of the two shells and the connecting walls, thus providing vertical side flues 54 and 55 and an intermediate flue 57. This arrangement provides a double wall lamp chamber 58 inside the inner shell 45 and opening outwardly through the doorway between the edges of the doorway flanges 48.

For utmost convenience in manipulating the projection lamp 27 for assembly or removal purposes, a mounting is provided therefor adapting it to be swung from a position wherein the lamp is entirely free for manipulation through the doorway in the lamp housing into the relatively close confines of the lamp chamber 58. To this end, a cylindrical lamp socket 59, adapted to receive the base of the lamp 27 removably, is removably and vertically adjustably supported by a bracket 60 (Figs. 3 and 6). This bracket is provided with pivot bosses 61 extending coaxially from opposite sides of the bracket to the lower front portions of the outer shell side walls 40 and 46 with which pivotal connection is effected by means of shouldered pintle bolts 62 secured to the side walls in the manner best seen in Fig. 4. To receive the lamp base 59, the bracket 60 is formed with a semi-circular, vertical axis cradle 63 within which the lamp socket is held adjustably by means such as a clamping strap 64 secured to the bracket as by screws 65. As a result of this construction, the lamp socket can be accurately adjusted vertically to attain optimum vertical positioning of the lamp, and this can be accomplished quickly and easily with full access to the socket 59 and the clamping strap 64 when the supporting bracket 60 is swung out to a position similar to that shown in broken outline in Fig. 3 or even further as permitted by the pivotal mounting of the bracket.

A full closure for the lamp access opening or doorway is provided by a door 67 which is preferably formed integral with the lamp-supporting bracket 60. In practice, the bracket 60 and the door 67 have conveniently and economically been formed as a light weight casting which lends itself well to die casting methods of manufacture.

At its side, the door 67 is formed to overlap the adjacent margins of the doorway flanges 48 of the lamp housing in the closed position. Means for, in effect, locking the door 67 may comprise a thumb screw 68 extending through an inwardly extending boss 69 at the top of the door and adapted to be threadedly engaged with a stationary nut 70 carried by a downwardly projecting flange 71 on a top closure 72 which caps the lamp chamber 58.

In the present instance, the door 67 is located on the opposite side of the lamp 27 from the condenser lens unit 30 and supports a mirror reflector 73 (Figs. 3 and 7). To this end, the reflector 73 is relatively loosely supported by a carrier 74 which in the present instance comprises a flat ring of slightly smaller internal diameter than and engaging the back of the reflector and equipped with a plurality of spaced prongs 75 engaging about the edge of the reflector. Means for connecting the reflector carrier 74 onto the door 67 herein comprises a plurality, such as three, screws 76 which extend freely through bores 77 in inwardly projecting bosses 78 on the door and are threaded through the carrier ring to draw it against respective coil springs 79. The latter are held in centered relation about the screws 76 by respective reduced diameter guide extensions 80 on the inner ends of the bosses 78. Through this arrangement, the reflector can be accurately adjusted for proper results, that is to direct the reflected light therefrom on the optical axis of the collecting condenser lens 30. At the same time the reflector is located as closely as practicable to the lamp 27 and is loosely enough mounted so that expansion due to the intense heat from the lamp will not cause breakage due to any binding between the reflector and its supports.

Carrying the condenser lens 30 is a preferably elongated tubular member 81 (Figs. 3, 5 and 7). Within the end of the carrying tube 81 which in assembly most closely approaches the lamp 27, the condenser lens 30, assembled within a protective split ferrule 82, is removably secured between a plurality of spaced locating bosses 83 and a plurality, herein three, set screws 84. In order to avoid damage from binding of the lens, the locating bosses 83 and the set screws 84 are disposed in relatively staggered relation. The set screws project threadedly radially through the end margin of the supporting tube 81 inwardly against bent-over securing flanges 85 which are struck out from the adjacent wall of the ferrule 82 and serve to secure the customary mounting flange of the lens against an inwardly projecting radial flange 86 on the ferrule. As shown at least two of the set screws 84 may be of the kind having digitally manipulable knurled heads, while the third may be an ordinary slotted-head type to be driven into place by a screw driver and affording more clearance. Removal of the two knurled head screws enables removal or replacement of the lens.

A slidable mount for the lens supporting tube 81 is afforded by a spider 87 which is formed integral within a tubular mounting ring 88 by which the lamp housing 34 is secured to the mounting plate 18 of the projector. As best seen in Figs. 3 and 6 the outer casing connecting wall 47 may be secured to the mounting ring 88 removably as by means of screws 89 and has an opening 90 through which the lens tube 81 may project. An opening 91 in the inner shell wall 51 also affords clearance for the lens tube. Removable attachment of the mounting ring 88 to the mounting plate 18 in concentric relation to the projection beam opening 31 may be effected through the medium of screws 92.

Due to certain inevitable variables in the lens, in the projection lamp and in associated structural features, it is highly desirable, if not essential, that the condenser lens 30 be axially adjustable in assembly to secure an optimum operative relationship to the lamp 27. Accordingly, the eye of the spider 87 is formed of sufficient length to serve as an adjustment guide for the lens supporting tube 81. Means for effecting and maintaining particular adjustment of the condenser lens assembly comprises in a simple and efficient form an adjusting screw 93 carried by the spider 87 and threaded into a radial lug or ear 94 adjacent to the inner end of the lens carrying tube 81. As best seen in Fig. 3, the adjusting screw 93 is preferably of such length that although its head is located in a readily accessible position at the front of the spider 87, an elongated cylindrical shank 95 extends slidably through a journal bore 96 in the spider parallel to the axis of the lens tube, and the threaded portion of the screw projects to a substantial extent beyond the cylindrical shank. To maintain the adjusting screw 93 against axial displacement, it is formed with an integral collar 97 adjacent to its head while a retaining element such as a nut 98 is driven from the threaded portion of the screw against a shoulder 99 which just clears the supporting portion of the spider at the adjacent end of the cylindrical portion 95. Through this arrangement, accurate incremental longitudinal adjustment of the condenser 30 is quickly effected by simply turning the screw 93 to drive the lens tube 81 longitudinally toward or away from the projection lamp 27.

Throughout the lamp housing structure special consideration has, of course, been given the cooling feature. Accordingly, the cooling circulation of air into and through the lamp housing, as induced by the blower fan 35, is controlled and directed to follow devious paths to sweep and dissipate heat from the various parts of the lamp housing and the lamp, reflector, and lens structure with substantially uniform efficiency. All of the heated air finally leaves the housing through a suction exhaust port 100 leading into the blower housing 37, at the zone of greatest heat adjacent to and surrounding the filament section of the projection lamp 27. As best seen in Figs. 5 and 7, the exhaust port 100 is defined by an annular flange 101 integral with the lamp housing and projecting through an aperture 102 in the housing side wall 40 and entirely through the vertical air duct 54 to extend endwise into an opening 103 in the contiguous inner shell side wall 49 so that all of the air exhausted through the port 100 will come from within the lamp chamber 58.

Most of the air circulated through the lamp housing 34 enters at the top of the flues surrounding the inner lamp chamber shell 45 and then travels down within the flues until it passes under the lower edges of the inner shell wall and up into the lamp chamber 58. In order to have the lamp chamber entirely surrounded by inflowing cooling air, even along the wall provided by the door 67, the latter is equipped with a spaced parallel baffle plate 104 which is dimensioned to extend in substantially closing relation between the inner shell side walls 49 and 50 and from the top closure 72 down to a position opposite the lower portion of the lamp 27. This provides a forced downdraft flue 105, the inner and outer walls of which are spaced apart substantially the same as in the companion flues. The spaced relation of the plate and door is determined by upper spacing bosses 107 to which the baffle plate 104 is attached as by means of screws 108, and by lower spacing bosses 109. Integral vertical reenforcing ribs 110 connect the respective vertically spaced pairs of bosses 107, 109. Air entering the lower end of the lamp housing 58 from the flues is controlled to sweep up along the projection lamp 27 from its base portion by a right angularly formed deflector baffle 111 formed integrally with the lower edge of the duct baffle 104 and extending horizontally across the bottom portion of the lamp chamber 58. The deflector 111 is supported adjacent to the connecting wall 51 of the inner shell by means of vertical spacer posts 112 which may be respectively formed with reduced diameter screw threaded ends 113 screwed into a platform 114 on the lamp supporting bracket 63. An air passage is provided through the bottom deflector 111 for upward passage of air along the lamp by a lamp clearance cut-out 115.

In order to assure strong downdraft circulation of air through the several vertical flues, the space into which the lower ends of the flues open below the inner shell walls and the horizontal baffle member 111 is thoroughly closed off by having the bracket platform 114 formed to marginally overlap a cooperating right angular inwardly extending closure flange 115 on the outer shell intermediate wall 47 and with inwardly extending cooperating closure flanges 117 carried by the respective outer shell side walls 40 and 46 (Figs. 3 and 5). In the present instance the flanges 117 are formed separately from the housing walls and have angular attachment flanges 118 by which they are secured as by means of screws 119 to the inner faces of the respective housing side walls.

Since the reflector 73 is located quite close to the lamp 27 and by concentrating and reflecting heat rays from the lamp directly back and through the lamp creates an intensification of heat which would ordinarily be damaging to the lamp, some of the cool air from the air duct 55 which is opposite to the outlet port 100 is caused to shunt through an appropriate opening 120 in the inner shell wall 50 directly into the lamp chamber 58 at a level which will cause the air to be drawn between and about the lamp and the reflector as it travels through the lamp housing to the withdrawal port. Overheating of the outer shell side wall 46 by heat rays escaping through the shunt opening 120 is avoided by interposing a baffle 121 into the down flue 55 between the inner and outer walls 50 and 46. By preference the baffle 121 is formed with an attachment flange 122 by which it is attached to the inner shell wall 50 at the side of the opening 120 nearest the reflector 73. An off-setting web 123 joins the flange 122 to the baffle 121 and provides an air diverting wall while the opposite edge of the baffle is near the flue 57 and affords an opening for reception of some air from that source. This arrangement assures that a liberal supply of air will enter between the baffle 121 and the wall 50 and will in large measure be drawn into the lamp chamber.

In order further to assure that air shunted through the opening 120 toward the reflector zone will be concentrated in that zone, a vertical baffle 124 is provided to extend up from the bottom baffle plate 111 to a height preferably above the lamp 127 and inwardly from the connecting inner shell wall 51 to a point beyond the center of the lamp. Since the vertical baffle 124 is interposed between a substantial portion of the lamp 27 and the air shunt opening 120, this baffle also serves as an additional heat interceptor assisting in avoiding transmission of heat by radiation to the outer housing wall 46.

In order to accelerate cooling of the collector condenser lens 30 and the supporting structure therefor, the lens-clearing aperture 91 in the connecting inner shell wall 51 is preferably somewhat larger than the lens supporting tube 81 (see Fig. 5) so that a portion of the cooling air within the duct 67 may directly enter the lamp chamber 58 about the lens. Air thus entering the lamp chamber is caused to travel in close proximity to the lamp 27, before escaping to the exhaust port 100, by a vertical baffle 125 which extends from beside the aperture 91 inwardly into the lamp chamber to a point adjacent to the reflector 73 and in spaced relation to the adjacent inner shell side wall 49 (Figs. 5 and 7). An opening 126 in the baffle 125 affords an opening for escape of heated air to the outlet 100.

Further cooling of the condenser lens 30 is effected by the provision of means whereby air that is drawn through the mounting plate aperture 31 may pass into and through the lens supporting tube 81 and out through narrow radial exhaust slots 127 closely adjacent to the condenser lens 30. Additional air drawn through the aperture 31 passes through the spider 87 and through the outer shell wall opening 90 and the inner shell opening 91 into the flue 57. A certain additional amount of cooling air is also drawn into the mounting ring 88 through gaps 128 afforded by limiting contact of the end of the mounting ring with the mounting plate 18 through the medium of a series of small spacer pads 129 formed on the end of the mounting ring, preferably at the points where the attaching screws 92 are threaded into the end of the ring. In addition to affording the air gap 128, the limited area spacer pads 129, by limiting the contact area between the parts avoid heat transfer from the mounting ring to the mounting plate.

Overheating of the top closure 72 of the lamp chamber by directly radiated heat from the lamp 27 is avoided by an interposed brightly polished overlying baffle 130 which is preferably supported by the inner casing wall 51 and extends at a slanting angle upwardly over the lamp so that the heat rays are reflected therefrom diagonally past the lamp toward the zone occupied by the reflector 73 where an accelerated and augmented flow of cooling air is provided, as previously described. This expedient taken together with the cooling sweep of air across the top of the closure 72 from all directions toward the surrounding downdraft air flues, and the efficiency with which heated air is exhausted from within the lamp housing, maintains the closure 72 cool enough so that when the blower 35 is operating to effect circulation of cooling air, a person may safely hold his hand upon the top closure.

Throughout the several views of the drawings the movement of the circulating air has been indicated by directional arrows. From these it will be seen how thoroughly all parts subject to heating within the lamp housing 34 and the supporting ring 88 are swept by the circulation cooling air, and how the volume of moving air is especially concentrated in those regions where greatest potential or actual heating occurs.

It will also be observed that the entire inner casing, defined by the inner shell 45, the top closure 72, and the door baffle plate 104, is substantially completely insulated from the outer casing, defined by the outer shell 44 and the door 67, by the very substantial volume of air sucked down through the flues 54, 55, 57, and 105. With especial regard to Figs. 3 and 5, it will be noted that the air while coolest and therefore most heat absorptive is drawn down past the hottest portion of the inner casing and is preheated before it comes in contact with the intensely heated projection lamp 27, thus avoiding any chilling shock or uneven cooling of the lamp. Then at the base of the inner casing, the down rushing air which has been relatively confined to narrow limits for high speed movement and cooling efficiency, is permitted to expand quite freely, thus increasing its heat absorbing capacity while at the same time entering the more direct suction influence of the blower fan 35 so that expansion and therefore continually increasing heat absorption capacity continues practically uninterruptedly until the heated air is exhausted. Due to the powerful suction effected by the blower fan 35 there is, of course, a continual tendency during operation toward a condition of vacuum within the lamp chamber 58, which assures the large volume influx and thorough passage of air resulting in the remarkably effective cooling attained by my system.

In addition of the efficient cooling of the lamp housing per se, the present system is also utilized to effect cooling of the parts of the projector heated by heat transmitted through or with the projection beam, at least up to and inclusive of the film gate 15, and also substantially all of the interior of the projector casing inside of the mounting panel 11. Thus, having more particular reference to Fig. 1, air drawn through the film gate 15, and an air circulation inlet 130 in front of the cover casing 17, passes through the interior of the housing 17, sweeping the condenser lens 33 and the deflection mirror 32 as well as adjacent elements. Such cooling air is supplemented by additional air sweeping up through a photoelectric cell opening 131 in the bottom of the casing 17 to cool an exciter lamp 132 and then passes as previously described through and beyond the projection beam opening 31 in the mounting panel.

By far the greater volume of air that is sucked into the lamp housing 34 is derived from within the mechanism chamber defined by the mounting panel 11 and the casing 12. Therefore any residual heat that might be present within such chamber due to the lamp housing itself is, of course, continuously drawn off. It may be noted from Fig. 2 that since the intake into the lamp housing is adjacent to the top of the casing this cooling effect is particularly efficacious.

A large volume of cool atmospheric air is permitted to enter the mechanism chamber from various directions so that the entire interior of the chamber will be continuously swept with cooling air moving toward the lamp housing. Thus, the spaced relation of the mounting panel flange 24 and the casing 12 provides a virtually continuous air gap 133 at least along the front, top and rear flanged edges of the mounting panel. In addition substantial air intake openings 134 and 135 are preferably provided in the end and side, respectively, of the housing 12 adjacent to the drive motor 28 so that the cooling air may sweep the motor 28 directly in line with the lamp housing. Air entering the side intake opening 135 will sweep the nozzle of the blower housing 37 which may tend to become somewhat heated due to the pressure of exhausting heated air. An air inlet through the mounting panel adjacent to the motor 28 may be afforded by an opening 136 or series of openings forming a grill which may be louvred or not as desired. In addition to this circulation of air, additional circulation may be effected by a fan 137, driven by the motor 25, which forces the air from the lower part of the mechanism chamber through an outlet opening 138 in the removable back 22 of the projector casing. Besides assuring circulation through the bottom of the mechanism chamber, this assures that the motor 25 will be thoroughly cooled and serves in the nature of a booster for circulation of cooling atmospheric air into the mechanism chamber so that at all times such chamber will be vigorously swept by a substantial volume of air both at the top and at the bottom of the chamber.

While I have illustrated and described a certain preferred embodiment of my invention, it is to be understood that I do not thereby intend to limit my invention to the specific form disclosed, but contemplate that various modifications, substitutions and alternative constructions may be effected without departing from the spirit and scope of the invention as defined in the appended claims.

I claim:

1. In combination in a motion picture projector of the character described, means providing a casing enclosure, a lamp housing disposed in substantially the central portion of the housing and having an air inlet opening at the top thereof disposed within the upper portion of the housing, a pair of drive motors located on respectively opposite sides of the lamp housing, air inlet openings in the casing adjacent to one of said motors, means for effecting suction circulation of air into said lamp housing through said top inlet to draw air from within the casing and force an inflow of cooling air through said casing inlet openings, for cooling said one motor, the remaining motor being disposed in a position substantially below the top of the lamp housing and having an impeller fan, and said casing having an exhaust opening adjacent to said impeller fan for the discharge of air from within the housing past said remaining motor and to supplement the cooling action of air circulating within the housing by forcing circulation of air in the lower part of the housing in addition to the circulation in the upper part of the housing induced by suction of air into the lamp housing.

2. In a cooling system for picture projectors of the portable cabinet type wherein the projection lamp is enclosed within very close confines in a housing having indirect openings communicating with the interior of the cabinet, and a reflector directs a reflected light beam through the lamp, and a lens in the housing wall condenses the projected light, means for effecting a large volume circulation of cooling air through the lamp housing in an insulating layer entirely surrounding the projection lamp and passing interiorly of the walls of said housing and uniformly sweeping the lamp in cooling relation, means shunting a concentrated air stream into cooling relation with the reflector and the adjacent portion of the lamp affected by the reflector beam, means shunting a second concentrated stream of air into the large volume past the lens and in cooling relation with the lens, and means effective for discharging the entire volume directly from the housing exteriorly of the cabinet, whereby the pressure and volume thereof are not decreased.

3. In combination in a motion picture projector including a casing, a vertical mounting panel substantially dividing the casing into two separate compartments, film handling and optical apparatus mounted on one side of said panel in one compartment, operating mechanism mounted on the second side of said panel and being disposed in said second compartment, a substantially completely enclosed housing mounted on said second side of said panel and in said second compartment, and having a projection lamp provided within said housing, said panel having an intercommunicating opening whereby light from the lamp may pass to said optical and film handling apparatus, and means for effecting a strong suction circulation of cooling outside air past said film handling and optical apparatus and through said mounting panel opening and thence through said lamp housing and directly therefrom, out of said casing.

4. In combination in a picture projector construction, a lamp housing adapted to substantially completely enclose a projection lamp and comprising inner and outer walls adapted to form air circulation flues therebetween, a top closure over the inner walls thereby providing openings for the flues between the inner and outer walls at the top of said housing, a member closing off the bottom of said housing and extending substantially between the outer walls thereof and being hingedly attached to said housing whereby said member may be moved away from said housing, said member being a bracket extending inwardly of the housing from the lower portion thereof for supporting a lamp socket, said member also being formed with a side of said housing comprising inner and outer walls as part thereof whereby when said member is moved away from said housing said side wall moves therewith, said member having means forming continuations of said flues whereby circulation completely about said housing and through said flues is effected, and means connected with said flues for causing a suction of cooling air directly from within said housing to expel said air exteriorly of said projector.

5. In combination in a projector construction of the character described, a lamp housing having a double wall structure providing air flues open at the top and constructed and arranged to deliver air to the interior of the lamp housing from below, said interior being substantially completely enclosed against the unuseful escape of light and having means therein for supporting a projection lamp, a reflector mounted within the lamp housing and adjacent to the position occupied by the projection lamp for directing a reflected beam of light through the lamp, means for effecting a suction circulation of cooling air through said flues and into and through the interior of the lamp housing, comprising a blower attached to said housing and adapted to suck air only directly from the interior of said housing and expel the same exteriorly of the projector and means for shunting air from one of the flues to pass in direct cooling relation to the reflector and the area of the lamp affected by the reflector light beam, comprising an opening in the inner wall adjacent said reflector and a baffle in the flue formed by said wall and scooping a portion of the cooling air sucked down said flue and directing same immediately against said reflector and said lamp area.

6. In combination in a projector construction of the character described, a substantially completely enclosed projector lamp housing having inner and outer walls and forming air circulating flues between said walls, a substantially completely enclosed impeller type air circulating device having an opening exteriorly of the projector, said circulating device being attached directly to said housing and having an opening extending from the interior of said housing thereto, and said flues being opened externally of said housing at one end thereof and within the projector and open only to the interior of said housing at the other end thereof whereby air drawn from the interior of the projector into said housing through said flues is forced to circulate in said housing prior to being discharged only through said circulating device and from said projector.

OTTO R. NEMETH.

REFERENCES CITED

The following references are of record in the file of this patent:

UNITED STATES PATENTS

| Number | Name | Date |
|---|---|---|
| 1,160,764 | Robinson et al. | Nov. 16, 1915 |
| 1,287,576 | De Vry | Dec. 10, 1918 |
| 1,338,818 | Dennington | May 4, 1920 |
| 1,814,269 | Terry | July 14, 1931 |
| 1,966,531 | Tint | July 17, 1934 |
| 1,971,454 | Loomis | Aug. 28, 1934 |
| 2,135,996 | Wood | Nov. 8, 1938 |
| 2,269,794 | Stachbart | Jan. 13, 1942 |
| 2,292,966 | Osterberg et al. | Aug. 11, 1942 |
| 2,344,263 | Perkins | Mar. 14, 1944 |